United States Patent [19]

Parent

[11] 4,103,958
[45] Aug. 1, 1978

[54] CAMPING VEHICLE BODY

[76] Inventor: Jean-Marc Parent, 9è rang, Wickham, Canada

[21] Appl. No.: 783,009

[22] Filed: Mar. 30, 1977

[30] Foreign Application Priority Data

Dec. 30, 1976 [CA] Canada .................................. 268956

[51] Int. Cl.² ............................................. B62P 3/32
[52] U.S. Cl. ...................... 296/23 C; 296/26
[58] Field of Search ................ 296/23 R, 23 C, 23 G, 296/26, 27

[56] References Cited

U.S. PATENT DOCUMENTS

| | | | |
|---|---|---|---|
| 3,160,435 | 12/1964 | Smith | 296/23 R |
| 3,575,460 | 4/1971 | Kennedy | 296/23 MC |
| 3,802,732 | 4/1974 | McKee | 296/23 R |

Primary Examiner—Richard A. Bertsch

[57] ABSTRACT

A vehicle body particularly conceived to constitute a bus body including a second floor, a collapsible roof, and collapsible side walls, and characterized by producing a livable space above the second floor upon lifting of the roof relative to the second floor to thus provide camping accommodation for a relatively larger number of persons than heretofore. This camping vehicle body includes collapsible side walls, made of flexible sheet material, and elastic bands attached to the flexible sheet material at points to bias the latter, such as to produce automatic folding thereof upon lowering of the roof. The roof is elevated by hydraulic cylinders with an intercoupling system connected to the hydraulic cylinders and producing concerted elevation and lowering of the roof.

4 Claims, 5 Drawing Figures

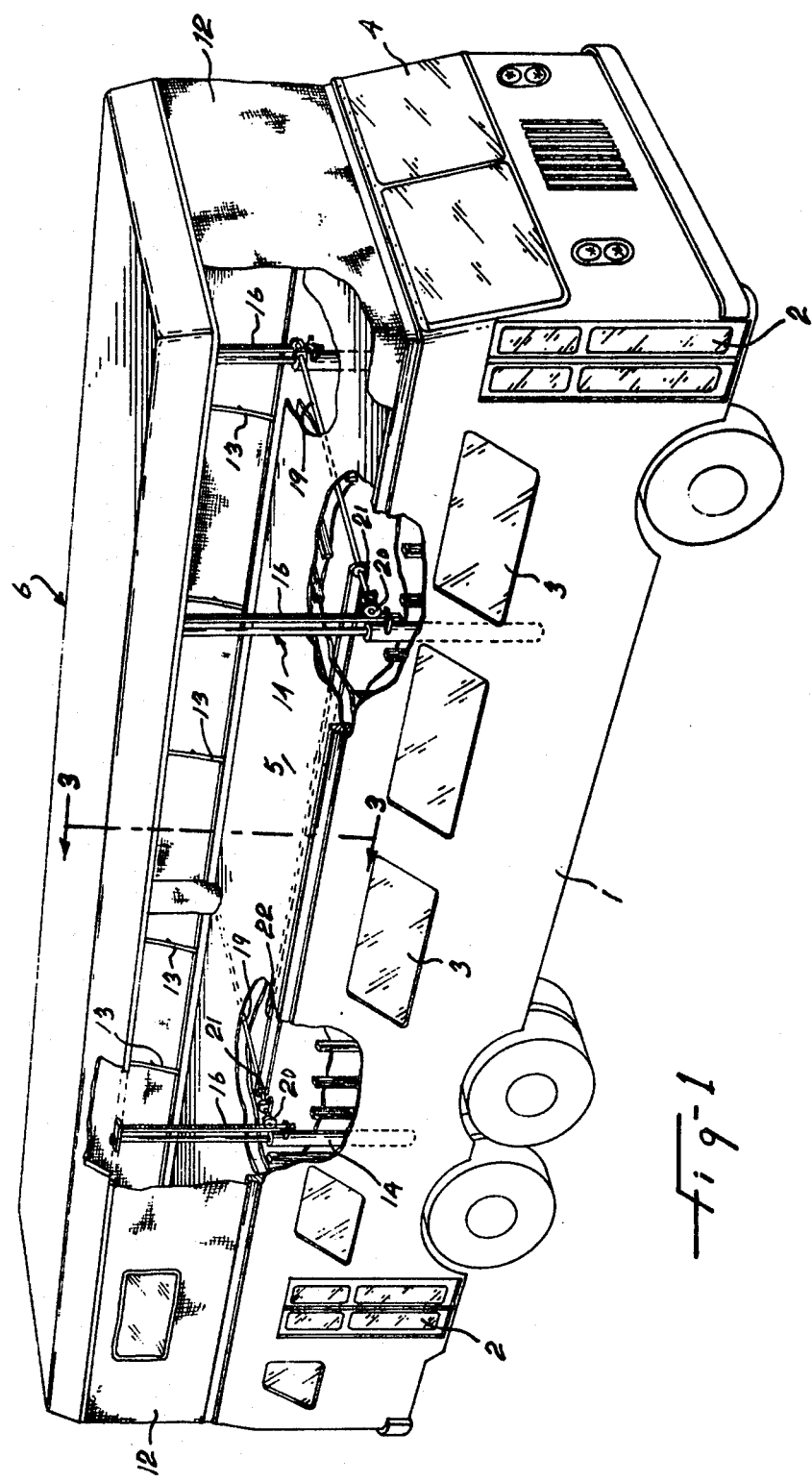

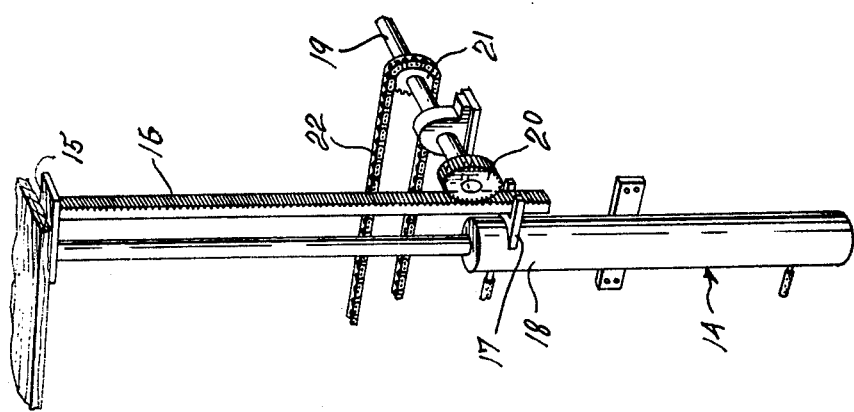
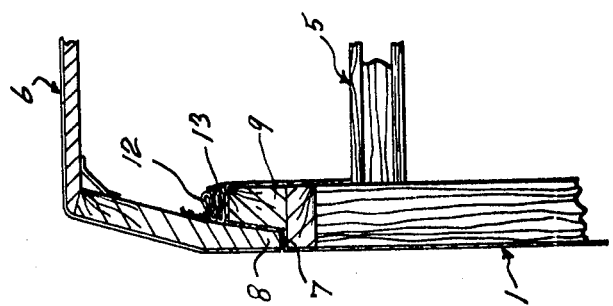
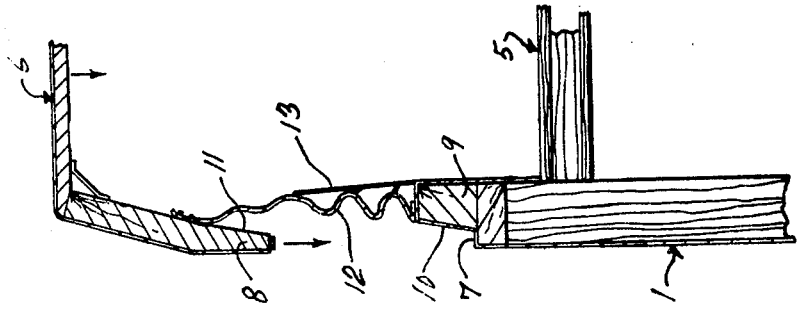
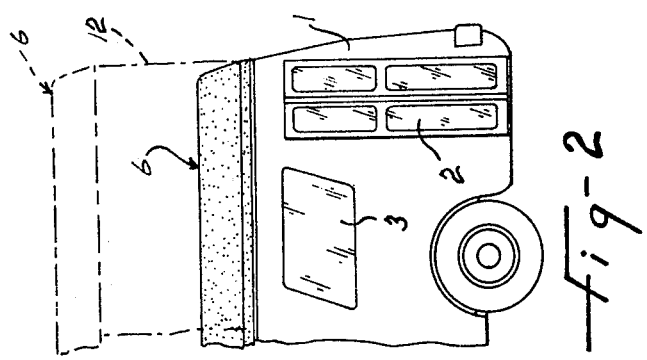

CAMPING VEHICLE BODY

This invention relates to a camping vehicle body and, more particularly, to a camping bus body of the collapsible type.

So far, there have been proposed different concepts of camping vehicles of the collapsible type; for instance, the collapsible tent trailers and odd collapsible campers. In these previously proposed collapsible camping vehicles, the roof is elevated or raised merely to increase the livable compartment or space; but there always remains a single storey or floor structure. As a result, for a vehicle of given road encumbrance or lateral dimensions, these concepts accommodate a very limited number of users, at the most 6 to 8.

It is a general object of the present invention to provide a vehicle of conventional road encumbrance, which provides camping and sleeping facilities for a relatively larger group of users or passengers than heretofore.

It is another general object of the present invention to provide a camping vehicle which produces more usable floor space than heretofore for a vehicle of given road encumbrance.

It is a further general object of the present invention to provide a camping bus body of the collapsible type and which accommodates a larger number of campers or users than heretofore in a vehicle body of the above type.

It is a more specific object of the present invention to provide a camping vehicle body of the above type which includes a collapsible roof and a second floor cooperatively defining a second storey or livable space on the second floor upon elevation or lifting of the roof.

It is another object of the present invention to provide a camping vehicle body of the above type, which includes a liftable roof and foldable peripheral walls wherein the latter is automatically folded upon lowering of the roof.

It is still another object of the present invention to provide a camping vehicle body of the above type which includes a roof and hydraulic cylinders to lift and lower the roof and wherein intercoupling of the hydraulic cylinders produces concerted lowering of the roof irrespective of the wind and other extraneous and adverse action against the roof.

The above and other objects and advantages of the present invention will be better understood with reference to the following detailed description of a preferred embodiment thereof which is illustrated in the accompanying drawings, in which:

FIG. 1 is a perspective view of a camping bus having a body according to the present invention and with parts broken away;

FIG. 2 is a side view of the front of the camping bus of FIG. 1; this time with the roof in lowered travel position;

FIG. 3 is a cross-sectional view as seen along line 3—3 in FIG. 1 with the roof shown in elevated position;

FIG. 4 is a cross-sectional view as in FIG. 3 but with the roof in lowered position; and FIG. 5 is a perspective view of a hydraulic cylinder with a portion of an intercoupling system.

The illustrated camping bus comprises a body including a first floor, not shown, and a peripheral side wall 1, of generally conventional construction, extending around this first floor and rigidly secured thereto. The peripheral side wall 1 includes conventional doors 2, windows 3 and 4, etc. A second floor 5 is fixedly secured to the peripheral side wall at a fixed height to define a passenger compartment extending between the first and second floors and inside the peripheral side wall 1.

A relatively rigid roof 6 covers the remainder of the bus body and, as will be explained later, is liftable and lowerable relative to the peripheral side wall 1 and the second floor 5. The peripheral side wall 1 has a peripheral upper edge which includes a shoulder 7 forming a rest for the rim 8 of the roof. The peripheral upper edge of the peripheral side wall 1 also includes a raised inner portion 9 having a peripheral face 10 which is transversely inclined upwardly inward. The rim 8 of the roof 6 includes an internal peripheral face 11 which is transversely inclined upwardly inward like the peripheral face 10 to rest in tight sealing engagement on the latter, as shown in FIG. 4, when the roof 6 is in lowered travel position.

A sheet of flexible material 12 is fixed around the periphery of the peripheral side wall 1 and roof 6 and thus laterally confines a livable compartment between the second floor 5 and the roof 6. This sheet of flexible material 12 is of canvas, nylon, or the like; has a peripheral lower edge fixedly secured on the raised portion 9 along the periphery of the peripheral side wall 1; and has an upper edge fixedly secured to the roof 6 along the periphery thereof. A plurality of elastic bands 13 are fixed against the internal side of the flexible sheet material 12, each at spaced-apart points along its length, and they extend lengthwise transversely relative to the sheet 12 and to the edges of the roof 6 and side wall 1. Thus, each elastic band 13 is fixed to the sheet 12 at upwardly spaced-apart points of the latter. When the roof 6 is lowered, the elastic bands 13 draw these upwardly spaced-apart points of the sheet 12 toward itself by its elasticity and then this produces automatic folding of the flexible sheet, as shown in FIG. 3. Consequently, when the roof 6 is lowered, the flexible sheet 12 is automatically folded inside the roof onto the peripheral raised portion 9.

Four hydraulic cylinders 14 are installed upright in the internal space defined by the peripheral side wall 1, as shown in FIG. 1. The hydraulic cylinders 14 are spaced from each other to evenly support the roof 6. Each hydraulic cylinder is fixed at its upper end to a plate 15 fixedly secured to the rim 8 of the roof. As best shown in FIG. 5, a toothed rack 16 extends lengthwise along each hydraulic cylinder 14 and is fixed at its upper end to the corresponding plate 15. Thus, each rack 16 is bodily displaced endwise with the roof 6 and is laterally guided by a fork member 17 fixed to the corresponding cylinder piece 18.

The four hydraulic cylinders 14 are transversely aligned in two transverse pairs: a forward pair and a rearward pair. A transverse shaft 19 extends transversely in the internal space defined by the second floor 6 in transverse registry with each transverse pair of hydraulic cylinders 14. A pinion 20 is fixedly secured at each end of each transverse shaft 19 to bodily rotate therewith. These pinion gears 20 are in meshing engagement with the racks 16 respectively. Thus, these shafts, pinions and racks provide rigid intercoupling of the two hydraulic cylinders 14 of each transverse pair.

The two shafts 19 are interconnected by a rotation transmitting assembly including a pair of sprockets 21 bodily rotating with these shafts respectively and an intercoupling chain 22.

The elements 16 to 22 inclusive thus produce an intercoupling system between the four hydraulic cylinders 14, such that the four corners of the roof 6 will be concurrently and evenly elevated and lowered, thereby preventing undue twisting and malfunctioning of the roof.

It must be appreciated that many changes in the details of construction may be made without departing from the concept and cope of the present invention as defined by the appended claims. For instance, the nature, construction and arrangement of the actuators for the roof and/or of the intercoupling system may be varied within the scope of the present invention and claims.

What I claim is:

1. A camping vehicle body comprising a first floor, a peripheral side wall fixed around said first floor and laterally confining a passenger compartment over said first floor, a roof covering said peripheral side wall and selectively liftable to a desired elevation above said peripheral side wall, a second floor fixedly secured to said peripheral side wall at a fixed height over said passenger compartment and below said roof, collapsible side walls positioned at the periphery of said second floor and of said roof and laterally confining a livable compartment between said second floor and said roof, said roof being liftable by means including hydraulic cylinders fixedly connected at the opposite ends to said roof and relative to said peripheral side wall respectively and selectively elevating and lowering said roof upon actuation, and an intercoupling system connected to said hydraulic cylinders and controlling concurrent operation thereof, said intercoupling system including a rack adjacent each of said hydraulic cylinders, fixedly secured relative to said roof and displaceable endwise bodily therewith, a gear meshing with each of said racks, shafts carrying said gears and bodily rotatable therewith, and a rotation transmitting assembly interconnecting said shafts and producing concerted rotation of the latter and of said gears and a resulting concerted endwise displacement of said racks.

2. A camping vehicle body as defined in claim 1, wherein said peripheral side wall includes a peripheral upper edge forming a shoulder defining a seat for said roof and the latter constitutes a relatively rigid cover having a rim portion operatively resting in lowered travel position onto said peripheral shoulder.

3. A camping vehicle body as defined in claim 2, wherein said peripheral upper edge includes one peripheral face transversely inclined upwardly inward and said peripheral rim includes another peripheral face transversely inclined upwardly inward and resting in tight sealing engagement with said one peripheral face.

4. A camping vehicle body as defined in claim 3, wherein said second floor is downwardly recessed relative to said peripheral upper edge of the peripheral side wall and operatively forms a compact space under and in cooperation with said roof, and said peripheral side wall and said roof cooperatively form the general outline of a bus upon resting of said roof on said peripheral side wall.

* * * * *